March 10, 1942. J. K. DIXON 2,276,229
PROCESS AND APPARATUS FOR EXOTHERMIC CATALYTIC REACTIONS
Filed Sept. 8, 1939
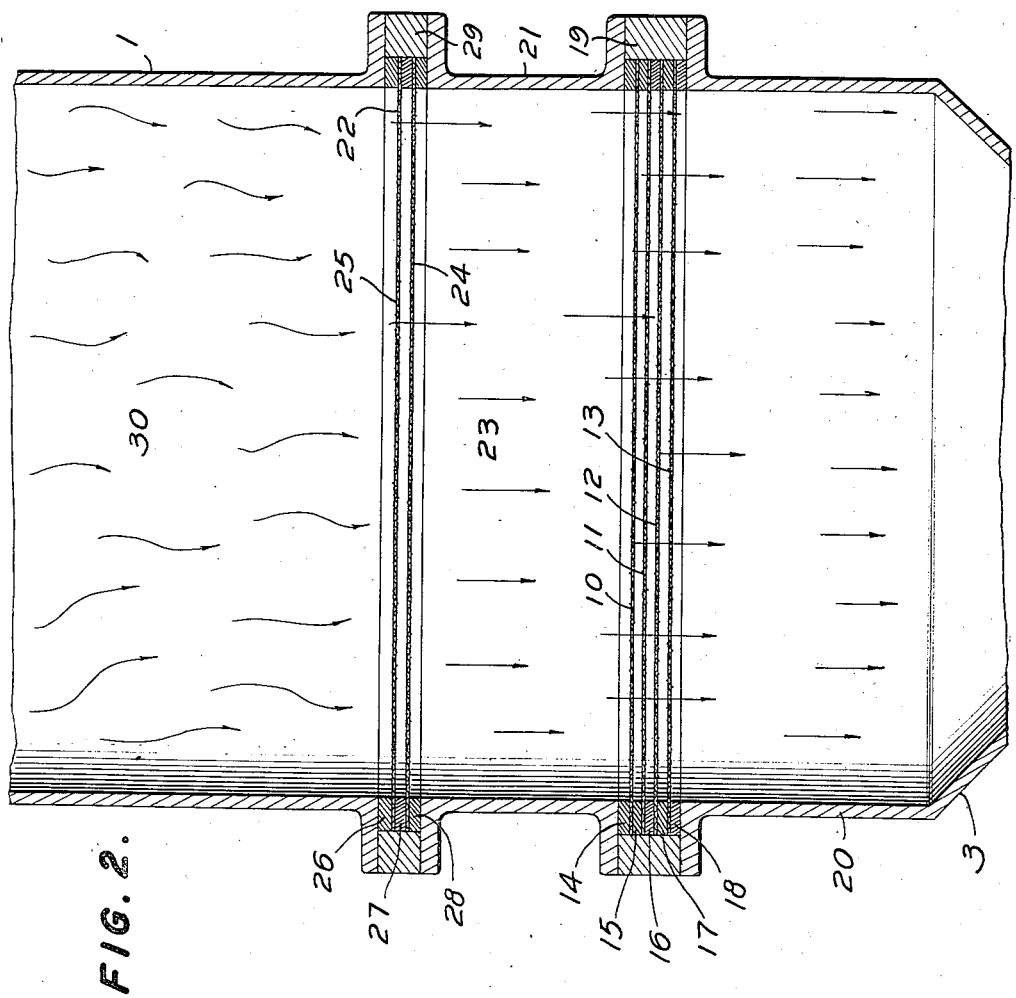
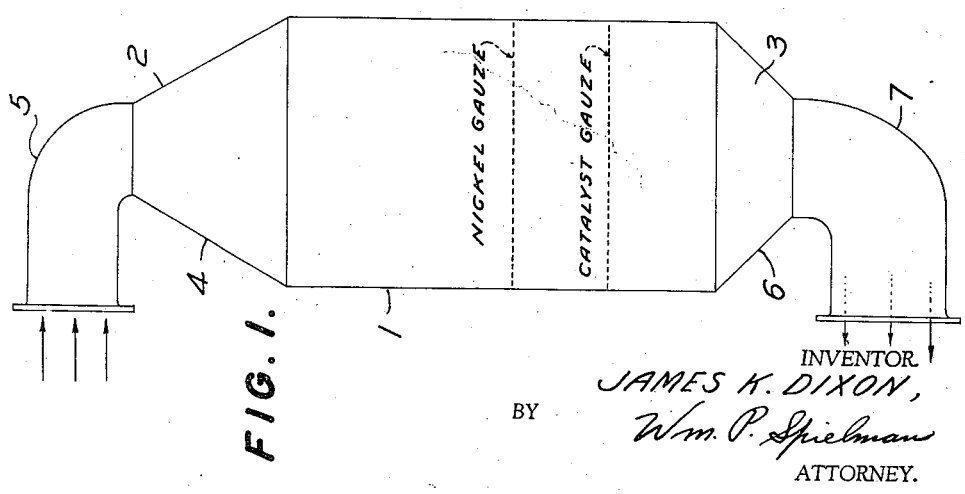
INVENTOR.
JAMES K. DIXON,
BY Wm. P. Spielman
ATTORNEY.

/ Patented Mar. 10, 1942

2,276,229

UNITED STATES PATENT OFFICE 2,276,229

PROCESS AND APPARATUS FOR EXOTHERMIC CATALYTIC REACTIONS

James K. Dixon, Bound Brook, N. J., assignor, by mesne assignments, to American Cyanamid Company, New York, N. Y., a corporation of Maine Application September 8, 1939, Serial No. 293,947

4 Claims. (Cl. 23—162)

This invention relates to a method and apparatus for carrying out vapor phase oxidations of the type in which a gauze type catalyst is used, such as the oxidation of ammonia to oxides of nitrogen, the vapor phase air oxidation of petroleum hydrocarbons to aldehydes and acids, the oxidation of methane to formaldehyde, the oxidation of ethylene to ethylene oxide and the like.

Hydrocarbons such as methane, ethane, acetylene and the like are frequently reacted with ammonia on platinum gauze catalysts to form hydrocyanic acid. Air is often added to the reaction mixture ahead of the catalyst, and the heat then liberated by the reaction is sufficient to maintain the gauze at 800–1200° C., which is the optimum temperature range for this reaction. The present invention may also be used in carrying out this process.

The efficiency of vapor phase reactions of the above type is dependent to a great extent upon the maintenance of a proper contact time between the gases and the catalyst, for an unduly prolonged time of contact will result in excessive total combustion. The presence of turbulence in the flow of gases over a gauze type catalyst is one of the chief causes of irregularities in contact time, for the lateral components inherent in the gas turbulence cause the gas to travel along the surface of a catalyst gauze instead of passing directly through it. Excessive gas turbulence also shortens the effective life of the catalyst gauze by causing unequal rates of flow through different parts thereof, which leads to overloading of some parts of the gauze and more rapid destruction of the overloaded areas.

It is a principal object of the present invention to provide a method and apparatus for performing vapor phase oxidations of the above type while avoiding turbulence at the catalyst surface. A further object of the invention resides in a method and apparatus for obtaining a straight line flow without subjecting the gases to extended contact with hot gas-directing surfaces, which would cause precatalysis therein. Still further objects of the invention will become apparent from the following description of a preferred embodiment of the invention in conjunction with the accompanying drawing, and will be pointed out in the claims appended hereto.

It has previously been proposed to obtain a straight line flow of gases in converters provided with gauze type catalysts by mounting a number of so-called gas diffusers immediately ahead of the catalyst gauze. These diffusers operate by reason of a gradual increase in cross section in the direction of gas flow, and thus require a substantial longitudinal dimension. The gas passing through the diffusers is thereby subjected to extended contact with the surfaces thereof, and since the diffusers are of necessity mounted in close proximity to the catalyst gauze these surfaces are extremely hot. In fact the temperature at the surfaces of the diffusers is about the same as the temperature of the catalyst gauze, for the diffusers are so mounted as to pick up radiant heat from the catalyst.

It is known that catalysis, and particularly vapor phase catalysis, is a surface phenomenon and that different materials produce different effects within the temperature ranges ordinarily employed. For this reason, certain materials such as platinum are classified as catalytic while other materials such as quartz are inherently non-catalytic. It is also known that a material such as nickel may be a catalyst for certain types of liquid phase or vapor phase reactions, but that it is not a suitable catalyst for the oxidation of ammonia. At temperatures above red heat, however, this distinction between catalytic and non-catalytic materials disappears to a great extent and even the inherently non-catalytic materials will cause total combustion by their surface action. From this discussion it is apparent that the diffusers which have been suggested for use in obtaining a straight line gas flow through the catalyst will cause precatalysis in the gases by the extended contact between the gas stream and very intensely hot surfaces even when they are constructed of materials which are non-catalytic at low temperatures.

I have now discovered that a straight line gas flow substantially devoid of turbulence can be obtained simply by passing the incoming stream of preheated gas through a gas distributing gauze or preferably through a plurality of gauzes. These gauzes may be composed wholly of an inherently non-catalytic material such as glass fibres, asbestos or the like or, in the case of ammonia oxidation, they may be composed of a material such as nickel which is non-catalytic at the temperatures at which they are maintained. One of the chief advantages of a gauze, as compared with gas diffusers or other types of deflectors that have previously been used, is its high ratio of surface area to volume which results in an unusually high rate of transfer of heat from the gauze to the surrounding atmosphere. Because of this high rate of cooling the distributing gauze maintains its temperature within a few degrees of the temperature of the surrounding gas. Therefore, it is only necessary to mount the gauze in the path of the incoming reaction gas mixture a short distance ahead of the catalyst to obtain a straight line gas flow while the incoming gas serves to cool the gauze to such an extent that precatalysis is completely avoided.

The invention will be illustrated in greater detail by reference to the accompanying drawing, in which:

Fig. 1 is a diagrammatic illustration of a catalytic converter of the down-flow type such as is used in the oxidation of ammonia, having an embodiment of the invention applied thereto; and Fig. 2 is a cross section of a part of the converter of Fig. 1, showing the installation of the gas distributing and catalyst gauzes.

Referring to Fig. 1, the converter consists generally of an intermediate central section 1 having parallel side walls surmounted by a gas inlet section 2 and seated upon a similar gas outlet section 3. The gas inlet section 2 consists of a conical section 4 and an inlet pipe 5 for the incoming gases while the outlet section 3 comprises a similar conical section 6 and gas outlet pipe 7. The entire converted shell is preferably constructed of or lined with materials that are not attacked by or reactive towards the reaction gas mixture or the reaction product. Thus, in the case of an ammonia oxidation converter, sections 1, 2 and 5 are composed of or lined with nickel, while chrome-nickel-steel is used for sections 3 and 7.

Referring to Fig. 2, which is an enlarged sectional view across the intermediate central part 1 of the converter, the catalyst gauzes preferably consist of platinum or of a platinum-rhodium alloy, and it should be understood that although four gauzes are shown any suitable number may be employed. The gauzes are preferably clamped between a series of clamping rings 14, 15, 16, 17 and 18, which rings are in turn surrounded by an annular section 19. The entire assembly is retained between opposed lower and upper sections 20 and 21 of the converter shell, which are preferably drawn together by stud bolts (not shown).

The gas distributing gauzes constituting a feature of the present invention are shown at 22 as being two in number, although it is understood that any suitable number may be employed. When a single gauze is used there is a likelihood of vibration at higher gas speeds with consequent disturbance of the gas flow in the space 23 between the catalyst and the gas distributing gauze. I have found, however, that when two gas distributing gauzes are used which are not in contact, such as the lower gauze 24 and the upper gauze 25 illustrated in the drawing, this difficulty due to gauze vibration is overcome and a smooth and uniform straight line flow of gases is obtained in the gas space 23.

The gas distributing gauzes 24 and 25 are preferably held between clamping rings 26, 27 and 28 similar to the rings used in retaining the catalyst gauze and surrounded by an annular section 29 clamped between sections of the converter shell in the same manner. It is understood, however, that the invention in its broader aspects is not limited to this method of mounting but that any suitable construction may be employed.

The distance between the upper catalyst gauze 10 and the lower gas distributing gauze 24 constitutes an important feature of the invention.

As has been explained, the presence of a gas distributing surface mounted in such proximity to the catalyst gauze as to be heated thereby creates a serious danger of precatalysis and consequent reduction in overall yield from the converter. It is evident, nevertheless, that the gas distributing device must be fairly close to the catalyst gauze to avoid the presence of turbulence in the gas when it meets the catalyst. It is one of the most important features of my invention that a single gauze, or preferably a plurality of gauzes, such as will create a straight line flow of gas, may be mounted across the gas inlet side of the converter within a reasonable distance of the catalyst without acquiring catalytic temperatures. As has been explained, the rate of transfer of heat from the gauze to the incoming reaction gas mixture is one important reason for this. Another reason resides in the fact that the surface available on a gauze for absorbing radiation is considerably less than its total apparent surface, and hence its capacity for absorbing radiant heat is less than that of a massive body. The value of both factors is rapidly increased with a reduction in the size of mesh and the size of wire of the gauze, and therefore the use of finer gauzes of 80–120 mesh, with wires or filaments having a diameter of about .0055 inch constitutes a preferred embodiment of my invention. Using nickel gauze, for example, mounted only 2 inches ahead of a platinum gauze, and employing a 10% ammonia-air mixture preheated to 200–350° C., and operating with a catalyst gauze temperature of 800–850° C., I have found that the temperature of the gas distributing gauze will never rise above 500° C. Since nickel has little if any destructive action on an ammonia-air mixture at 500° C., it is evident that such an arrangement is suitable for commercial practice. However, for reasons of safety as well as for greater ease in mounting, I prefer to locate the gas distributing gauze or gauzes a greater distance ahead of the catalyst; a distance on the order of 8 inches above the top catalyst gauze is preferred. At this distance there is no appreciable rise in the temperature of the gas distributing gauze over the temperature of the incoming reaction gas mixture irrespective of the catalyst gauze temperature.

The operation of the converter which has been described and the method which is performed by its operation are apparent from the above description. A preheated reaction gas mixture such as a 10% ammonia-air mixture is passed into the gas inlet 5 of the converter and down through the conical section 4 into the upper part 30 of the central section 1. In this part of the converter there is turbulence in the flow of the gases, due to their high velocity around corners and through pipes of varying cross section. This turbulence is indicated diagrammatically by the arrows in the chamber 30 of Fig. 2. Upon passage of the gas through the gas distributing sections or gauzes 24 and 25 this turbulence entirely disappears and a straight line flow is obtained in the central chamber 23 as indicated by the arrows in this section. The gases then pass through the catalyst gauzes 10, 11, 12 and 13 in the usual manner whereby their ammonia content is converted to nitrogen oxides at high efficiency and the oxidation products leave the converter through the outlet pipe 7. It should be noted that, although the temperature at the catalyst gauzes is usually maintained at 700–950° C. in modern ammonia oxidation converters, the temperature of the gas distributing gauzes 24 and 25 is but little higher than that of the incoming reaction gas mixture for any heat absorbed is readily dissipated to the inlet gas and the overall temperature rise of the inlet gas and distributing gauze is negligible.

Although the invention has been described in detail with reference to a preferred modification thereof, it is understood that in their broader aspects the principles of the invention are limited only by the scope of the claims appended hereto.

What I claim is:

1. A catalytic converter comprising in combination a converter shell having a gas inlet and a gas outlet, a catalyst gauze mounted across said shell between said inlet and said outlet, and at least one gas distributing gauze composed wholly of an inherently non-catalytic material mounted across said shell between the catalyst gauze and the gas inlet, said gas distributing gauze causing a straight line flow of gases through the catalyst gauze and being spaced so far from the catalyst gauze that it is incapable of becoming heated to temperatures substantially higher than those of the incoming gases by the exothermic reaction at the catalyst when the converter is operated with preheated gases.

2. A catalytic converter comprising in combination a converter shell having a gas inlet, a gas outlet, and an intermediate central section having parallel side walls, at least one catalyst gauze mounted across said central section, and two gas distributing gauzes composed wholly of an inherently non-catalytic material mounted closely adjacent to each other across said central section between the catalyst gauze and the gas inlet, said gas distributing gauzes causing a straight line flow of gases at the catalyst and being spaced so far from the catalyst gauze that they are incapable of being heated to temperatures substantially higher than those of the incoming gases by the exothermic reaction at the catalyst when the converter is operated with preheated gases.

3. A method of carrying out vapor phase reactions of the type in which a gauze type catalyst is employed which comprises first passing a preheated reaction gas mixture through a gas distributing gauze composed wholly of an inherently non-catalytic material whereby a straight line gas flow substantially devoid of turbulence is obtained and then passing the gas mixture through the catalyst gauze, the space between the catalyst and the gas distributing gauze being sufficiently large to prevent the absorption of heat from the catalyst gauze by the gas distributor at a rate greater than the rate of heat discharge of the gas distributing gauze into the incoming gas stream at temperatures below red heat.

4. A method of oxidizing ammonia to nitric oxide which comprises passing a preheated ammonia-air mixture through a gas distributing gauze composed wholly of an inherently non-catalytic material whereby a straight line gas flow substantially devoid of turbulence is obtained and then passing the gas mixture through the catalyst gauze, the space between the catalyst and the gas distributing gauze being sufficiently large to prevent the absorption of heat from the catalyst gauze by the gas distributor at a rate greater than the rate of heat discharge of the gas distributing gauze into the incoming gas stream at temperatures below red heat.

JAMES K. DIXON.